United States Patent [19]

Maeda

[11] Patent Number: 4,508,318

[45] Date of Patent: Apr. 2, 1985

[54] ELECTRIC HOIST

[75] Inventor: Kazuo Maeda, Yokohama, Japan

[73] Assignee: Kabushiki Kaisha Kito, Yamanashi, Japan

[21] Appl. No.: 524,634

[22] Filed: Aug. 19, 1983

[30] Foreign Application Priority Data

Aug. 25, 1982 [JP] Japan ............................... 57-146211

[51] Int. Cl.[3] .......................... B66D 1/14; F16D 7/00

[52] U.S. Cl. .................................... 254/350; 254/903; 192/48.3; 192/48.92; 192/56 R; 464/37; 464/46

[58] Field of Search ........................ 254/350, 903, 370; 192/56 R, 48.3, 48.92, 48.6; 464/46, 38, 37

[56] References Cited

U.S. PATENT DOCUMENTS

| | | | |
|---|---|---|---|
| 2,501,096 | 3/1950 | Robins et al. | 254/903 X |
| 3,072,234 | 1/1963 | Maurice et al. | 192/48.3 |
| 3,741,527 | 6/1973 | Dahl | 254/350 |
| 3,953,000 | 4/1976 | Zorbaugh | 192/56 R X |
| 4,023,744 | 5/1977 | Shutt | 254/903 X |
| 4,348,011 | 9/1982 | Honda | 254/350 |

FOREIGN PATENT DOCUMENTS 42937 11/1978 Japan .

*Primary Examiner*—John M. Jillions
*Assistant Examiner*—Joseph J. Hail, III
*Attorney, Agent, or Firm*—Sughrue, Mion, Zinn, Macpeak, and Seas

[57] ABSTRACT

An electric hoist includes an electric motor, a driving shaft connected to a rotor shaft of said electric motor, a reduction gear train for transmitting rotation of the driving shaft to a load sheave, and a mechanical brake assembly in the reduction gear train. According to the invention between the driving shaft and the rotor shaft of the motor is arranged an overload safety device comprising a casing fitted through a one-way clutch onto the rotor shaft, a first support member fixed to the rotor shaft, a second support member slidably fitted on the driving shaft, a retainer member fixed to the casing, friction plates respectively arranged between the first and second support members and between the second support member and the retainer member, and dish-shaped springs for urging the retainer member against the first support member, thereby transmitting torque through one of the friction plates in raising a load and through both the friction plates in lowering the load and effecting such a changing-over by means of the one-way clutch. With this arrangement, the electric hoist according to the invention is able to automatically prevent lifting, lowering and dragging a load under overload condition, and enables the once raised load to be securely lowered irrespective of its light or heavy weight.

4 Claims, 4 Drawing Figures

ELECTRIC HOIST

BACKGROUND OF THE INVENTION

1. Field of the Invention:

This invention relates to an electric hoist having overload safety means for preventing lifting, lowering and dragging under overload condition and capable of securely lowering a load irrespective of its light or heavy weight.

2. Description of the Prior Art:

With electric hoists such as electric chain blocks whose load sheave is driven through reduction gears by electric motors, it has been proposed to provide on a driven shaft of a reduction gear mechanism a brake assembly consisting of a brake support member, a brake retainer member, a brake ratchet wheel and friction plates between the members and further provide an overload safety device including frictional connections interposed between the brake retainer member and a driven gear fitted thereon. This is done in order to obstruct raising of a load by slippage in the overload safety device when the load sheave is subjected to an overload.

With this such an electric hoist, however, the friction transmission force of the overload safety device often becomes less than that of the brake assembly owing to its overtightening, so that once raised the load cannot be lowered due to slippage in the overload safety device.

In order to solve this problem, it has been proposed to interpose a one-way clutch between the driven gear and the brake retainer member to render inoperative the overload safety device when lowering the load, as disclosed for example in Japanese Patent Application Publication No. 42,937/78. In this case, however, since the overload cannot be prevented in lowering the load, it is indispensably required to provide a limit switch for detecting a lowermost position of the load in view of the safety in operation which would possibly make the hoist complicated.

SUMMARY OF THE INVENTION

It is therefore a primary object of the invention to provide an improved electric hoist which solves these problems of the prior art.

It is a general object of the invention to provide an electric hoist comprising between a rotor shaft and a driving shaft an overload safety device including a one-way clutch and a plurality of friction plates so as to transmit torque through one of the friction plates in lifting a load and through both the friction plates in lowering the load and to effect such a changing-over by means of the one-way clutch, thereby automatically preventing the lifting, lowering and dragging of a load under overload condition and enabling the once raised load to be securely lowered irrespective of its light and heavy weight.

In order to achieve the above objects, the electric hoist including an electric motor, a driving shaft connected to a rotor shaft of said electric motor, a reduction gear train for transmitting rotation of said driving shaft to a load sheave, and a mechanical brake assembly in said reduction gear train according to the invention comprises an overload safety device arranged in a connection between said driving shaft and said rotor shaft of said motor, said overload safety device comprising a casing fitted through a one-way clutch onto said rotor shaft, a first support member fixed to said rotor shaft, a second support member slidably fitted on said driving shaft, a retainer member fixed to said casing, friction plates respectively arranged between said first and second support members and between said second support member and said retainer member, and urging means for urging said retainer member against said first support member.

In one preferred embodiment of the invention, the urging means is at least one dish-shaped spring and is made adjustable by a nut threadedly engaged on the driving shaft.

In order that the invention may be more clearly understood, preferred embodiments will be described, by way of example, with reference to the accompanying drawings.

DETAILED DESCRIPTION OF THE PREFERRED EMBODIMENT

Figure 1:
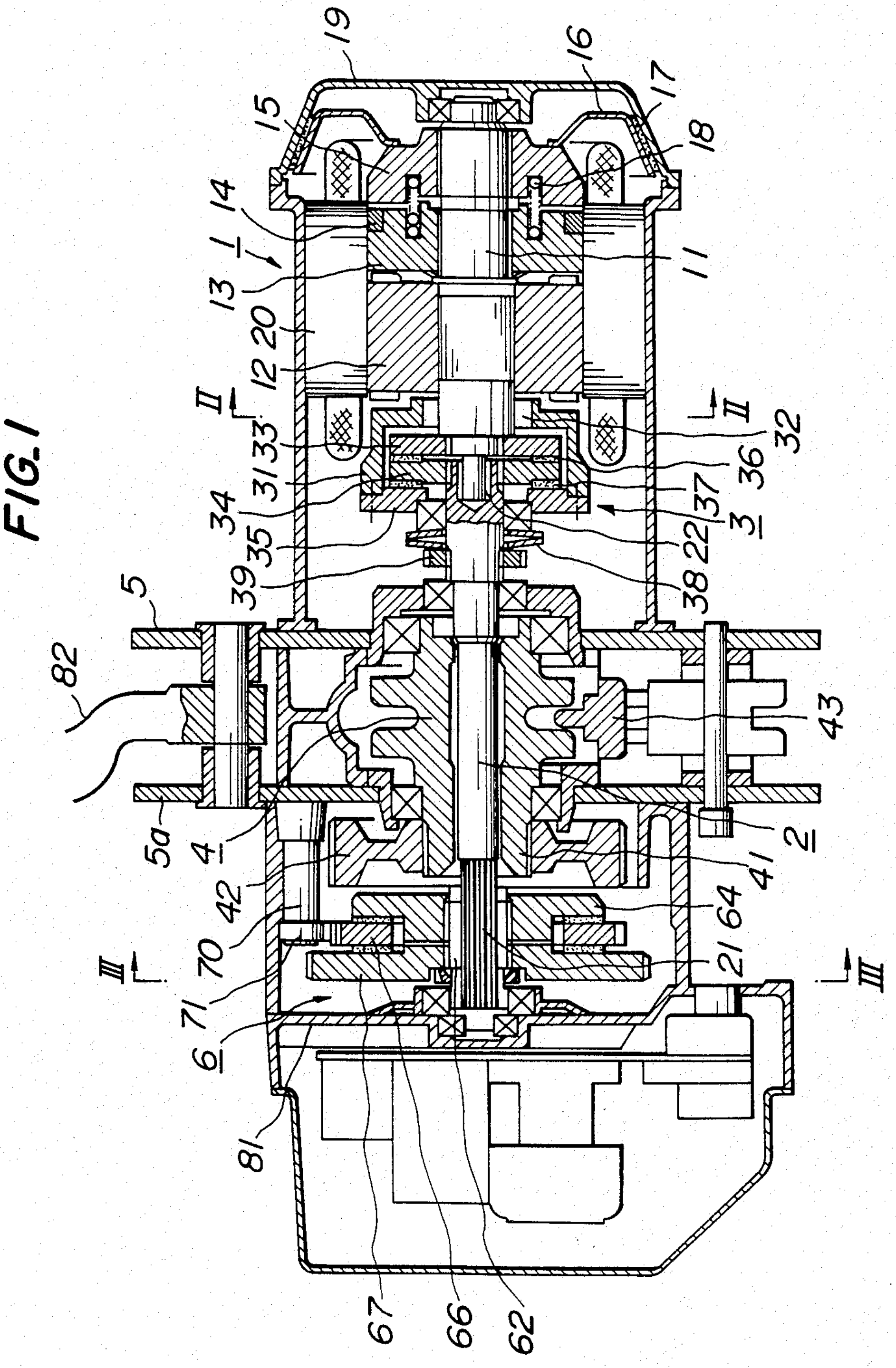
FIG. 1 is a longitudinal sectional view of one embodiment of an electric hoist according to the invention.

Referring to FIG. 1 illustrating one embodiment of the invention, an electric hoist comprises an electric motor 1 including a rotor 12 fixed to a rotor shaft 11. A magnetic pole member 13 and an attracted member 15 are made of a magnetic material with a disc 16 provided on its outer periphery with a friction plate 17. The magnetic pole member 13 and the attracted member 15 are axially slidably fitted on the rotor shaft 11 with spline connections or the like. Between the magnetic pole 13 and the attracted member 15 is interposed a spring 18 normally resiliently urging the attracted member 15 to the right as viewed in FIG. 1 to force the friction plate 17 against a front frame 19. The magnetic pole member 13 is made of a non-magnetic material and is provided on its one surface in opposition to the attracted member 15 with a number of attractor elements 14 made of a magnetic material radially embedded in the magnetic pole member 13. A reference numeral 20 denotes a stator of the motor.

Figure 2:
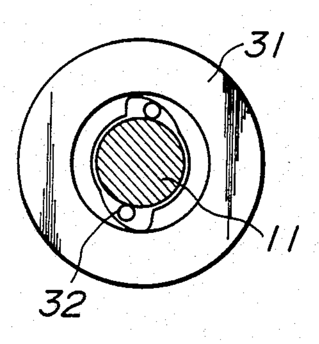
FIG. 2 is a cross-sectional view taken along a line II—II in FIG. 1.

The electric hoist further comprises a driving shaft 2 connected through a bearing 22 to the rotor shaft 11 and having at its one end a pinion 21. An overload safety device 3 is arranged in a connection between the rotor shaft 11 and the driving shaft 2. The overload safety device 3 comprises a cylindrical casing 31 fitted on the rotor shaft 11 through a one-way clutch 32 whose construction is as shown in FIG. 2. While the overload safety device 3 is being operated, when the rotor shaft 11 is rotated in a winding-off direction or a clockwise direction as viewed in FIG. 2, the one-way clutch 32 is actuated to transmit the rotation to the casing 31, but does not transmit the rotation to the casing 31 when the rotor shaft 11 is rotated in a winding-up direction or a counter clockwise direction as viewed in FIG. 2.

A first support member 33 is fitted through serrations, splines or the like on the rotor shaft 11. A second support member 34 is fitted through serrations, splines or the like on the driving shaft 2. A retainer member 35 is fitted through a bearing on the driving shaft 2 and fixed to the casing 31. Friction plates 36 and 37 are arranged between the support members 33 and 34 and between the second support member 34 and the retainer member 35, respectively. A resilient member 38, such as dish-shaped springs, is arranged around the driving shaft 2 between an adjusting nut 39 and the retainer member 35 to urge the friction plates 36 and 37 against the support members 33 and 34 and the retainer member 35.

A load sheave 4 having at its one end a shaft 41 is loosely fitted on the driving shaft 2 and journaled in bearings in frames 5 and 5*a*. A driving gear 42 is fixedly fitted on the shaft 41 of the load sheave 4. A chain guide 43 is arranged in opposition to the load sheave 4.

Figure 3:
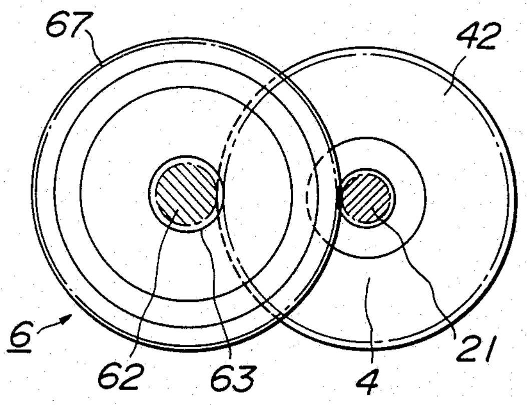
FIG. 3 is a cross-sectional view taken along a line III—III in FIG. 1.
Figure 4:
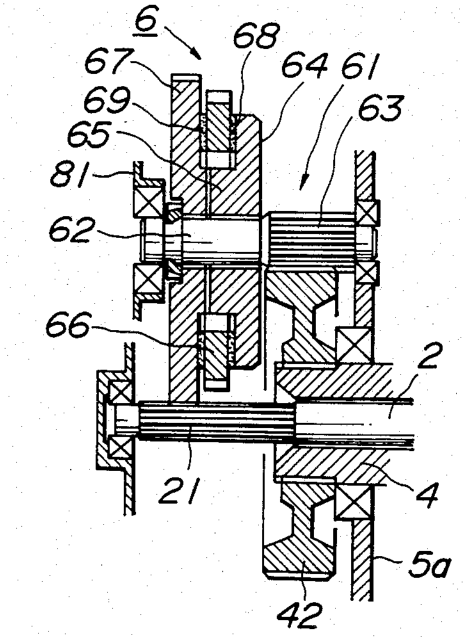
FIG. 4 is a sectional view illustrating a mechanical brake assembly used in the hoist shown in FIG. 1.

A screw type mechanical brake assembly 6 comprises as shown in FIGS. 3 and 4 a driven shaft 61 arranged in parallel with the driving shaft 2 and formed with a screwthreaded portion 62 and a pinion 63, a brake support member 64 having a boss 65 fixedly engaged with the threaded portion 62 of the driven shaft 61, a brake ratchet wheel 66 loosely or rotatably fitted on the boss 65 of the brake support member 64, a driven gear 67 engaged with the threaded portion 62 of the driven shaft 61 and adapted to be in mesh with the pinion 21 of the driving shaft 2, and friction plates 68 and 69 respectively interposed between the ratchet wheel 66 and the driven gear 67 and brake support member 64. As can be seen from FIG. 4, the pinion 63 of the driven shaft 61 is in mesh with the driving gear 42.

A brake pawl 71 is pivotally mounted on a shaft 70 fixed to the frame 5*a* as shown in FIG. 1 and urged by a spring (not shown) to engage the ratchet wheel 66. A reference numeral 81 denotes a rear frame. A hook 82 serves to hang the electric hoist from a ceiling or cross girder. The rotor shaft 11 and driving shaft 2 are journaled in bearings in the front frame 19, frames 5 and 5*a* and rear frame 81. The driven shaft 61 is also journaled in bearings in the frames 5*a* and the rear frame 81.

The operation of the electric hoist constructed as above mentioned according to the invention will be explained hereinafter. When the motor 1 is energized for lifting or winding up a load, the attractor elements 14 in the magnetic pole member 13 are magnetized to attract the attracted member 15 to the magnetic pole member 13 against the force of the spring 18 so that the disc 16 is moved to the left as viewed in FIG. 1 to release the braking action of the friction plate 17 so as to permit the rotor shaft 11 to be rotated. The rotation of the rotor shaft 11 is transmitted through the support member 33, friction plate 36 and support member 34 to the driving shaft 2.

The rotation of the driving shaft 2 is transmitted through its pinion 21 to the driven gear 67 (FIG. 4). As the driven gear 67 rotates, it moves to the right as viewed in FIGS. 1 and 4 on the threaded portion 62 of the driven shaft 61 owing to the threaded engagement therebetween to join the driven gear 67, ratchet wheel 66 and brake support member 64 together with the friction plates 68 and 69 interposed therebetween into a frictionally combined unit. Accordingly, the driven shaft 61 is rotated to cause the load sheave 4 to be rotated through the driving gear 42 engaged with the pinion 63, so that the load is raised or lifted by a chain (not shown) wound about the load sheave 4. It is of course understood in this case that the rotating speed of the driving shaft 2 is considerably reduced through the reduction gear train including the pinion 21, driven gear 67, pinion 63 and driving gear 42 to be transmitted to the load sheave 4.

If the weight of the load is more than a rated value, the friction plate 36 of the overload safety device 3 is slipped relative to the support member 33 or 34 and the one-way clutch 32 in the casing 31 is brought into an inoperative condition, so that the rotor shaft 11 is idly rotated without transmitting the torque of the rotor shaft to the driving shaft 2. As the load cannot be raised or lifted under such a condition of the hoist, the hoisting or dragging of the overload is automatically prevented.

When the motor 1 is deenergized, the attracted body 15 is returned to its original position by means of the spring 18 to urge the friction plate 17 against the front frame 19 so as to cause the braking action which holds the hoisted load in its position.

When the load is to be lowered, the motor 1 is energized to rotate the rotor shaft 11 in a reverse direction. The rotation of the rotor shaft 11 is transmitted through the support member 33, friction plate 36 and support member 34 to the driving shaft 2. The rotation of the driving shaft 2 is then transmitted to the pinion 21 and driven gear 67 so that the load is lowered with the aid of the mutual action of the weight of the load and the mechanical brake assembly 6.

If an overload occurs during lowering the load, the friction plate 36 of the overload safety device 3 is slippd relative to the support member 33 or 34. The rotation of the rotor shaft 11 is intended to cause the driving shaft 2 to rotate through the casing 31 and retainer plate 35 owing to the action of the one-way clutch 32 in the casing 31. However, as the another friction plate 37 is slipped relative to the support member 34 or the retainer member 35, so that all the friction plates 36 and 37 are slipped without transmitting the torque on the rotor shaft 11 to the driving shaft 2. In this case, the torque causing the slippage of the two friction plates is twice that permitting one friction plate to slip. Accordingly, even if a stopper (not shown) provided on one end of the chain wound about the load sheave 4 remote from the other end suspending the load strikes the chain guide 43 at the lowermost position of the load, the lowering of the load is stopped without any damage of the chain guide 43, thereby automatically preventing the lowering of the overload. The electric hoist according to the invention can therefore dispense with a limit switch for detecting the lowermost position for winding-off a load.

Moreover, even if the mechanical brake assembly 6 is clamped to an excess extent when a lifting load is stopped, the load can be securely lowered without stoppage of the load during lowering because the winding-off torque of the overload safety device 3 has been set to be larger than the friction transmission force of the mechanical brake assembly 6.

In the above explanation, one example of the one-way clutch for use in the overload safety device has been shown in FIG. 2. However, other one-way clutches may be used for this purpose. Moreover, instead of the screw type mechanical brake assembly, a cam type mechanical brake assembly may be used.

As can be seen from the above description, the electric hoist according to the invention comprises a one-way clutch in the connection between a driving shaft and a rotor shaft of a motor and an overload safety device constructed as its winding-off torque larger than its winding-up torque, thereby automatically preventing the lifting, lowering or dragging of a load under overload condition, and enabling the once raised or lifted load to be securely lowered regardless of its light or heavy weight. Therefore, the electric hoist according to the invention brings about significant effects in actual use.

It is further understood by those skilled in the art that the foregoing description is that of preferred embodiments of the disclosed hoists and that various changes and modifications may be made in the invention without departing from the spirit and scope thereof.

What is claimed is:

1. An electric hoist including an electric motor, a driving shaft connected to a rotor shaft of said electric motor, a reduction gear train for transmitting rotation of said driving shaft to a load sheave, and a mechanical brake assembly in said reduction gear train, comprising an overload safety device arranged in a connection between said driving shaft and said rotor shaft of said motor, said overload safety device comprising a casing fitted through a one-way clutch onto said rotor shaft, a first support member fixed to said rotor shaft, a second support member slidably fitted on said driving shaft, a retainer member fixed to said casing, friction plates respectively arranged between said first and second support members and between said second support member and said retainer member, and urging means for urging said retainer member toward said first support member.

2. An electric hoist as set forth in claim 1, wherein said one-way clutch comprises steel rollers and a disc having recesses for embracing said steel rollers therein with the aid of said rotor shaft to connect said clutch when it is rotated in one direction.

3. An electric hoist as set forth in claim 1, wherein said casing is cup-shaped so as to enclose said first and second support members and said friction plates, and said retainer plate is fixed to an open end of said cup-shaped casing in a manner closing the open end.

4. An electric hoist as set forth in claim 1, wherein said urging means is at least one dish-shaped spring and is made adjustable by a nut threadedly engaged on said driving shaft.

* * * * *